United States Patent [19]

Kommrusch et al.

[11] Patent Number: 5,489,946
[45] Date of Patent: Feb. 6, 1996

[54] HIGH SPEED SYNC SEPARATION SYSTEM AND METHOD

[75] Inventors: Steven J. Kommrusch; Bradley J. Foster, both of Ft. Collins, Colo.

[73] Assignee: Hewlett-Packard Company, Palo Alto, Calif.

[21] Appl. No.: 506,663

[22] Filed: Jul. 25, 1995

Related U.S. Application Data

[63] Continuation of Ser. No. 221,434, Mar. 31, 1994, abandoned.

[51] Int. Cl.⁶ .................................................. H04N 5/06
[52] U.S. Cl. ........................................ 348/528; 348/524
[58] Field of Search ................................. 348/521, 522, 348/528, 529; H04N 5/06, 5/08

[56] References Cited

U.S. PATENT DOCUMENTS

| | | | |
|---|---|---|---|
| 3,699,256 | 10/1972 | Roth | 348/528 |
| 4,032,974 | 6/1977 | Van Roessell | 348/521 X |
| 4,084,187 | 4/1978 | Schlotzhauer | 348/528 |
| 4,860,099 | 8/1989 | Kuwajima | 348/524 X |

*Primary Examiner*—Victor R. Kostak

[57] ABSTRACT

A synchronization (sync) separation system and method quickly and accurately generate a sync signal from an analog video signal by using feedback control. The system comprises a voltage generator for generating first and second reference voltages $V_{REF1}$, $V_{REF2}$. A first comparator compares the analog video signal to the first reference voltage $V_{REF1}$ and generates a shift control signal, A voltage shift mechanism receives the shift control signal and adjusts the analog video signal so that the sync level of the analog video signal converges toward the first reference voltage $V_{REF1}$. A second comparator compares the analog video signal with the second reference voltage $V_{REF2}$ and generates the sync signal indicative of when the analog video signal exhibits the sync level. Preferably, the voltage shift mechanism introduces a continuous current $i_c$ into the analog video signal. Moreover, the second comparator is an ECL differential line receiver in the preferred embodiment for providing a sync signal which is compatible with ECL.

10 Claims, 7 Drawing Sheets

HIGH SPEED SYNC SEPARATION SYSTEM AND METHOD

This is a continuation of application Ser. No. 08/221,434 filed on Mar. 31, 1994, now abandoned.

FIELD OF THE INVENTION

The present invention generally relates to processing of analog video signals, and more particularly, to a system and method for quickly and accurately generating by using feedback control a synchronization signal from an analog video signal which indicates when the analog video signal exhibits a synchronization level.

BACKGROUND OF THE INVENTION

Figure 1:
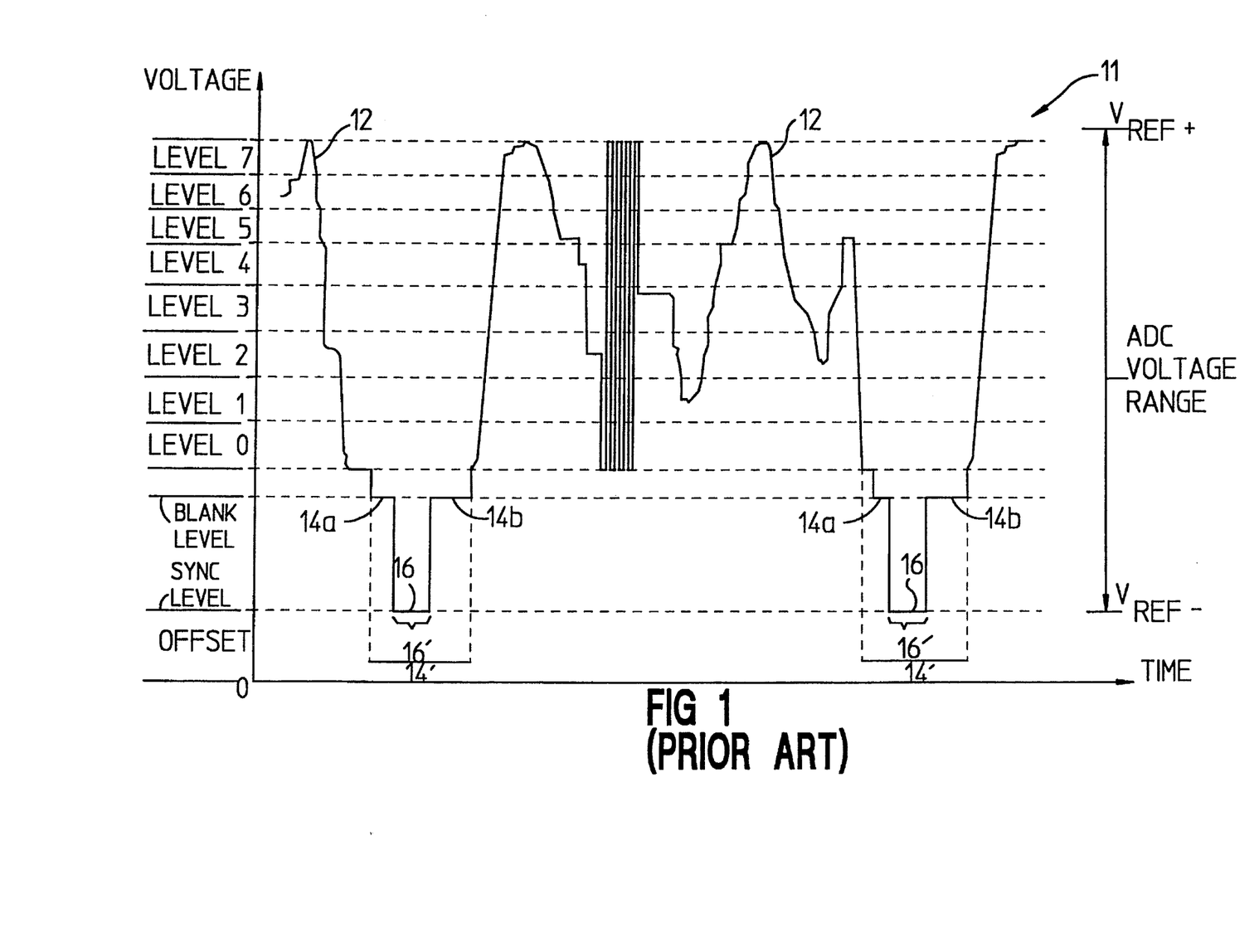
FIG. 1 is a graph illustrating a typical composite analog video signal with blank levels and sync levels.

A typical analog video signal 11 for driving an analog video display is illustrated in FIG. 1. As shown in FIG. 1, the analog video signal 11 is a composite signal having lines of analog data 12 combined with other sweep and synchronization (sync) signals, which include a blank level 14, having a front porch 14a and a back porch 14b, and a sync level 16. A blank period is defined as including the front porch 14a, the sync level 16, and the back porch 14b, and a sync period is defined as the time period in which the analog video signal 11 exhibits the sync level 16. The front porch 14a essentially cues the electron beam associated with a raster display to turn off when the beam sweeps from the end of a scan line to the beginning of the next scan line. The sync level 16 cues the electron beam to change either a scan line or a frame, depending upon its time period, and/or resets counters and other support circuitry. When the sync level 16 cues a scan line, then it is referred to as a "horizontal sync" (Hsync). When the sync level 16 cues a frame, i.e., when it exhibits an extended time period, then it is referred to as a "vertical sync" (Vsync). Furthermore, the back porch 14b permits initialization of the electron beam and other support circuitry prior to acting upon a new scan line or frame.

If the analog video display is multicolor, then there would generally be one of the analog video signals 11 allocated to each color, such as for red, green, and blue. However, only one of the analog video signals, for instance, the one allocated to green, usually has the sync levels 16.

Figure 2:
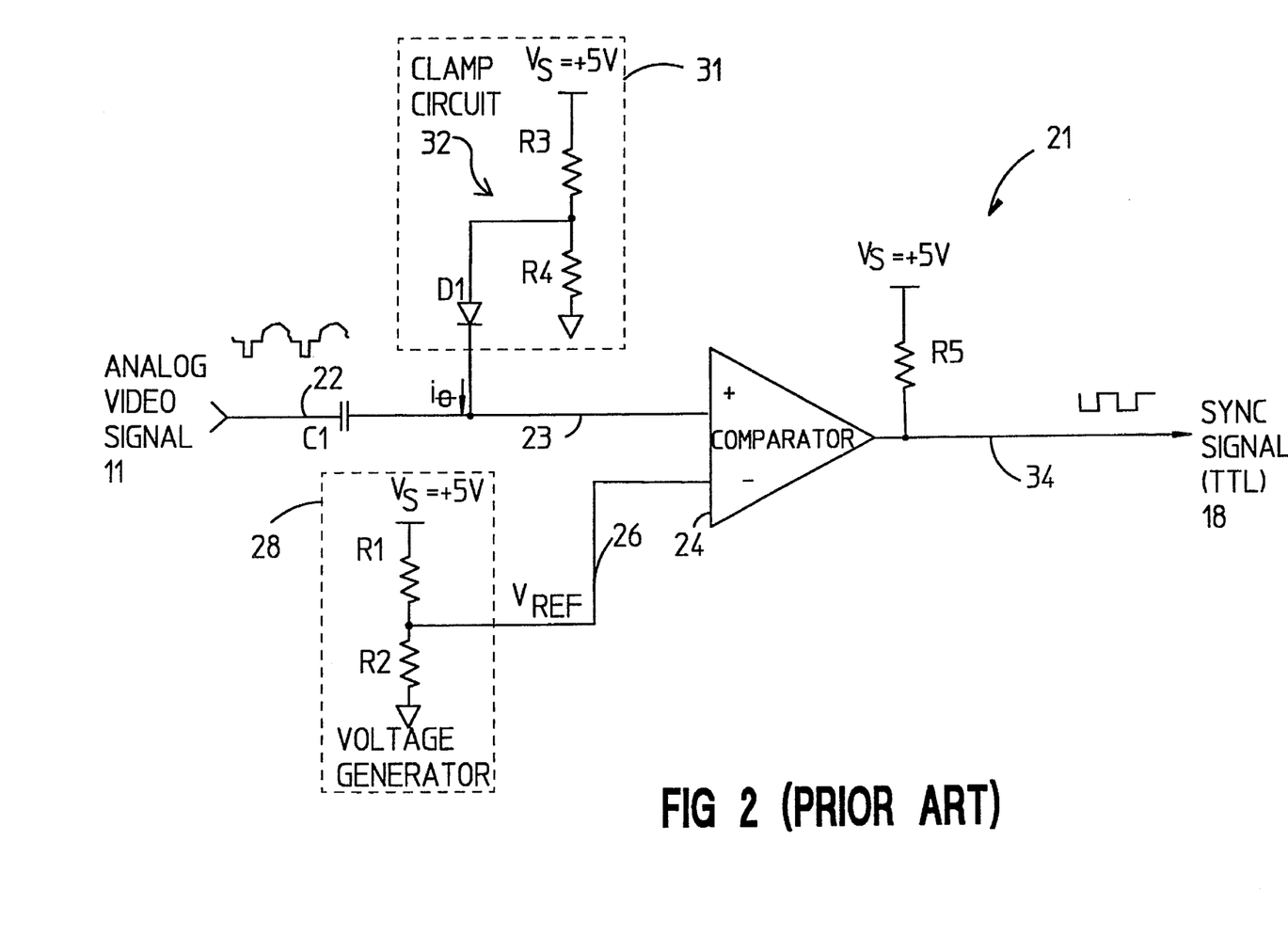
FIG. 2 is a schematic circuit diagram of a sync separation system of the prior art.

Recently, there has been a trend in the industry toward developing video displays which are driven by digital video signals as opposed to analog video signals. An example of such a digital video display is the model LQ12D011 TFT LCD flat panel display manufactured and made commercially available by the Sharp Corporation, Japan. Thus, it has recently been desirable to convert the analog video signal 11 of FIG. 1 into a digital video signal for driving a digitally-controlled display. This process can be described graphically with reference to FIG. 1. Referring to FIG. 1, in the process of converting the analog video signal 11 into a digital video signal, the analog data 12 is converted to a series of digital codes, depending upon its amplitude at a given point in time. For Sharp's digital display device, the analog data 12, which typically represents 256 different intensity levels for a particular color, must be converted to only 8 intensity levels, as is represented in FIG. 1 by levels 0 through 7. The lowest possible color intensity level is commonly referred to as the "black" level, whereas the highest possible color intensity level is commonly referred to as the "white" level, In order to properly convert the analog video signal 11 to a digital video signal comprising a series of digital codes, it is necessary to generate a sync signal for indicating when the analog video 11 exhibits the sync levels 16. A typical sync separation system 21 is illustrated in FIG. 2. A sync separation system, similar to that shown in FIG. 2, can be implemented with the model CXA1365S sync discriminator for a CRT (cathode ray tube) display manufactured and made commercially available by the Sony Corporation, Japan.

As illustrated in FIG. 2, the sync separation system 21 sometimes has a capacitor C1 for shifting the voltage swing of the incoming analog video signal 11 by a predetermined offset. The capacitor C1 is connected to the noninverting terminal (+) of a voltage comparator 24, which compares the shifted analog video signal at the noninverting terminal 23 with a reference voltage $V_{REF}$ at the inverting terminal 26 (−) of the comparator 24. The reference voltage $V_{REF}$ is often generated with a voltage divider 28 comprised of resisters R1, R2 for dividing the supply voltage $V_S$. A clamp circuit 31 ensures that the shifted analog video signal at the noninverting terminal 23 does not descend below a predetermined voltage amplitude. The clamp circuit 31 comprises a voltage divider 32 having resisters R3, R4 for establishing a voltage across a diode D1, which is connected to the noninverting terminal 23. If the voltage on terminal 23 begins to drop below the predetermined voltage amplitude, the clamp circuit 31 will introduce current $i_0$ into the analog video signal 11 to thereby maintain the voltage level at terminal 23 above the predetermined voltage amplitude. Furthermore, the sync separation system 21 is usually compatible with transistor-transistor logic (TTL), and therefore, the supply voltage $V_S$ is usually set at about +5 volts, and the sync separation system 21 is usually equipped with a resistor R5 for pulling the output of the voltage comparator 24 to and from industry recognized TTL voltage levels.

In general, the precision of the sync separation system 21 in comparing the shifted analog video signal at the noninverting terminal 23 with the reference voltage $V_{REF}$ at the inverting terminal 26 is not optimum and manifests itself as a horizontal shift in the sync signal output on connection 34 from the comparator 24. One reason for the imprecision is that the comparator 24 introduces a certain amount of propagation uncertainty, or uncertainty of the propagation delay. Another reason is that the current $i_0$ from the clamp circuit 31 and the reference voltage $V_{REF}$ are generated and controlled independently, and therefore, the signals at terminals 23, 26, which are compared by the comparator 24, exhibit inconsistent propagation delays which leads to an inaccurate comparison by the comparator 24. In the sync separation system 21 of FIG. 2, a typical propagation uncertainty is about 60 to 100 nanoseconds ($10^{-9}$ seconds).

Despite the propagation uncertainty, the sync separation system 21 is useful with CRT displays, because CRT displays can easily accommodate for any slight horizontal shift associated with the sync signal on output connection 34. As long as the sync separation system 21 has a constant total propagation uncertainty from frame-to-framer a CRT display generally has no problem accurately displaying the data.

However, although the prior art sync separation systems are useful in separating out sync levels for CRT displays, the prior art sync separation systems are not useful in a high frequency sync separation system for an analog-to-digital interface. This is because the analog-to-digital conversion generates a dot clock signal and synchronizes it with the output 34 of the sync separation system 21. Moreover, the propagation uncertainty associated with the sync signal must be far less than the time period allocated to each picture element (pixel) by the dot clock signal. However, at high frequency, the pixel time window becomes very small. For example, at 84.5 million pixels per second, the pixel time window is approximately 11.82 nanoseconds. Accordingly, a high frequency analog-to-digital interface cannot tolerate the propagation uncertainties (60 to 100 nanoseconds) associated with prior art sync separation systems, including that which is shown in FIG. 2.

SUMMARY OF THE INVENTION

Therefore, an object of the present invention is to overcome the deficiencies and inadequacies of the prior art as noted above and as generally known in the industry.

Another object of the present invention is to provide a system and method for accurately generating a sync signal from an analog video signal which is indicative of when the analog video signal exhibits a sync level.

Another object of the present invention is to provide a sync separation system and method for quickly determining when the analog video signal exhibits a sync level.

Another object of the present invention is to provide a system and method for generating a sync signal indicative of when an analog video signal exhibits a sync levels while optimally minimizing propagation uncertainties associated with the sync signal.

Another object of the present invention is to provide a sync separation system which is simple in design, inexpensive to manufacture, and reliable as well as efficient in operation.

Briefly described, the present invention is a sync separation system and method. The system comprises a voltage generator, first and second comparators, and a voltage shift mechanism. The voltage generator is configured to generate first and second reference voltages. The first comparator is configured to compare the analog video signal to the first reference voltage and is configured to generate a shift control signal. The voltage shift mechanism is configured to receive the shift control signal and to adjust the analog video signal so that the sync level of the analog video signal converges toward the first reference voltage. The second comparator is configured to compare the analog video signal to the second reference voltage and is configured to generate the sync signal indicative of when the analog video signal exhibits the sync level. Accordingly, feedback is utilized to accurately generate the sync signal from the analog video signal.

The present invention can also be broadly conceptualized as a method. The method comprises the following steps: generating first and second reference voltages; performing a first comparison between the analog video signal and the first reference voltage; adjusting the analog video signal based upon the first comparison so that the sync level of the analog video signal converges toward the first reference voltage; performing a second comparison between the analog video signal and the second reference voltage; and generating the sync signal indicative of when the analog video signal exhibits the sync level based upon the second comparison.

In addition to accomplishing all of the objects set forth previously, the present invention also has other additional advantages, a few of which are listed hereafter.

An advantage of the present invention is that the sync separator can be used in connection with a dot clock for sampling the analog video signal at frequencies greater than 100 million pixels per second without loss of pixels or color accuracy.

Another advantage of the present invention is that the voltage shift mechanism does not introduce electrical spikes into the analog video signal as the offset of the analog video signal is modified. The reason is that the voltage shift mechanism is implemented as a variable current source which continuously introduces current into the analog video signal.

Another advantage of the present invention is that the sync separator produces a sync signal which is compatible with very fast logic families, including but not limited tog ECL.

Another advantage of the present invention is that the sync separator optimally accommodates for noise in the analog video signal with a Schmitt trigger mechanism.

Other objects, features, and advantages of the present invention will become apparent to one of skill in the art upon examination of the following drawings and detailed description. It is intended that all other objects, features, and advantages be incorporated herein.

BRIEF DESCRIPTION OF THE DRAWINGS

The present invention can be better understood with reference to the following drawings. The drawings are not necessarily to scale, emphasis instead being placed upon clearly illustrated principles of the present invention.

DETAILED DESCRIPTION OF THE PREFERRED EMBODIMENT

Figure 3:
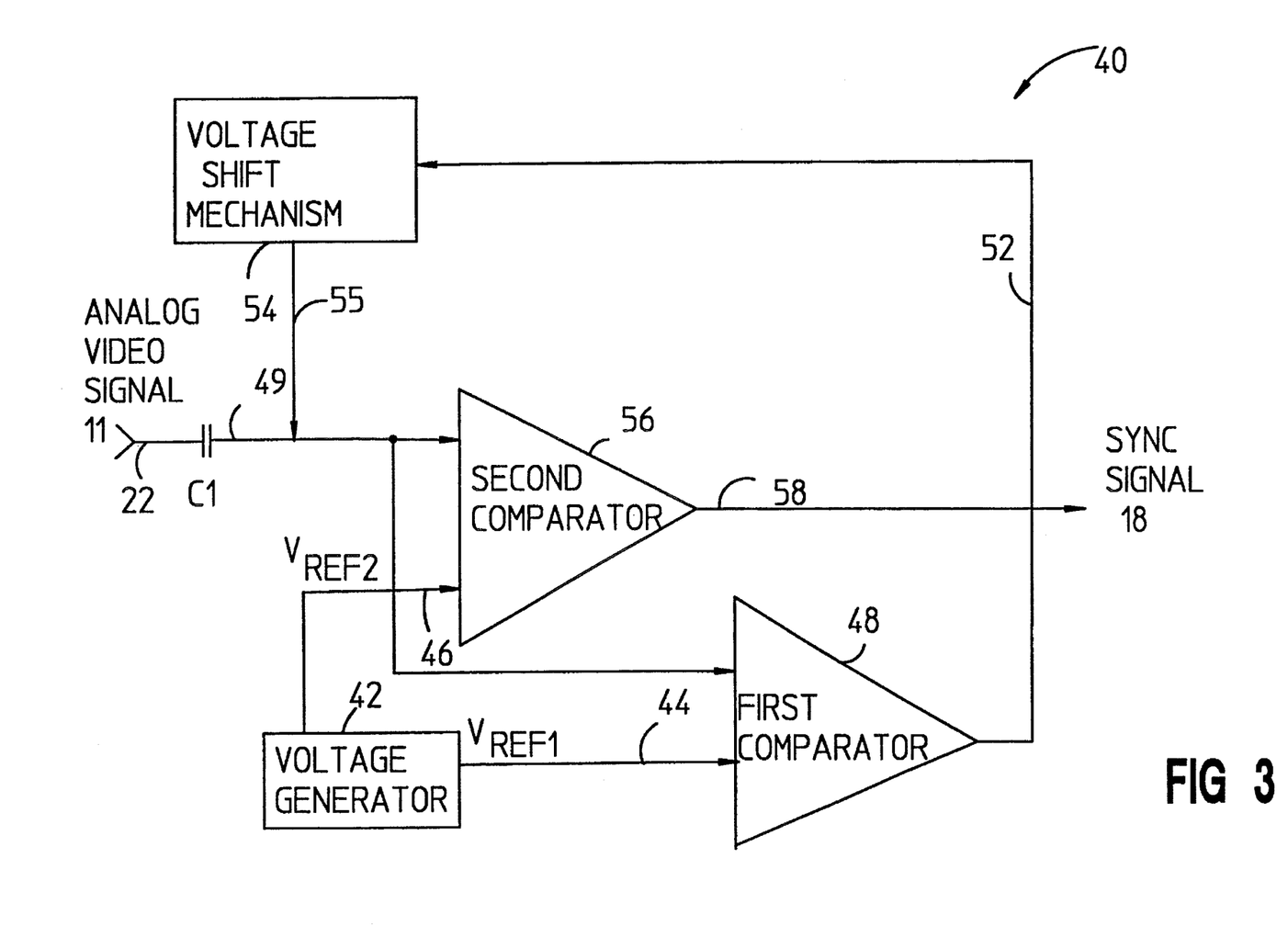
FIG. 3 is a schematic circuit diagram of a novel sync separation system in accordance with the present invention.

With reference now to the drawings wherein like reference numerals designate corresponding parts throughout the several views, a novel sync separation 40 in accordance with the present invention is illustrated in FIG. 3. The sync separation system 40 quickly and accurately generates a sync signal 18 with minimal propagation uncertainty from the analog video signal 11 (FIG. 1) by using feedback control.

In structure, the sync separation system 40 comprises a voltage generator 42 configured to generate first and second reference voltages $V_{REF1}$, $V_{REF2}$, denoted at respective reference numerals 44, 46. A first comparator 48 is configured to compare the analog video signal 11 on input connection 49 to the first reference voltage $V_{REF1}$ on voltage generator output connection 44. Based upon this comparison, the first comparator 48 generates a shift control signal on the first comparator output connection 52. The first comparator output connection 52 is connected to a voltage shift mechanism 54. The voltage shift mechanism 54 is configured to adjust the analog video signal 11 on input connection 49 so that the sync level 16 (FIG. 1) of the analog video signal 11 converges toward the first reference voltage $V_{REF1}$. The capacitor C1 isolates the incoming analog signal 1i on connection 22 so that it can be offset. Finally, a second comparator 56 is configured to compare the analog signal 11 on connection 49 to the second reference voltage $V_{REF2}$ and is configured to generate the sync signal 18 on output connection 58, which indicates when the analog video signal 11 exhibits the sync level 16 (FIG. 1).

Figure 4:
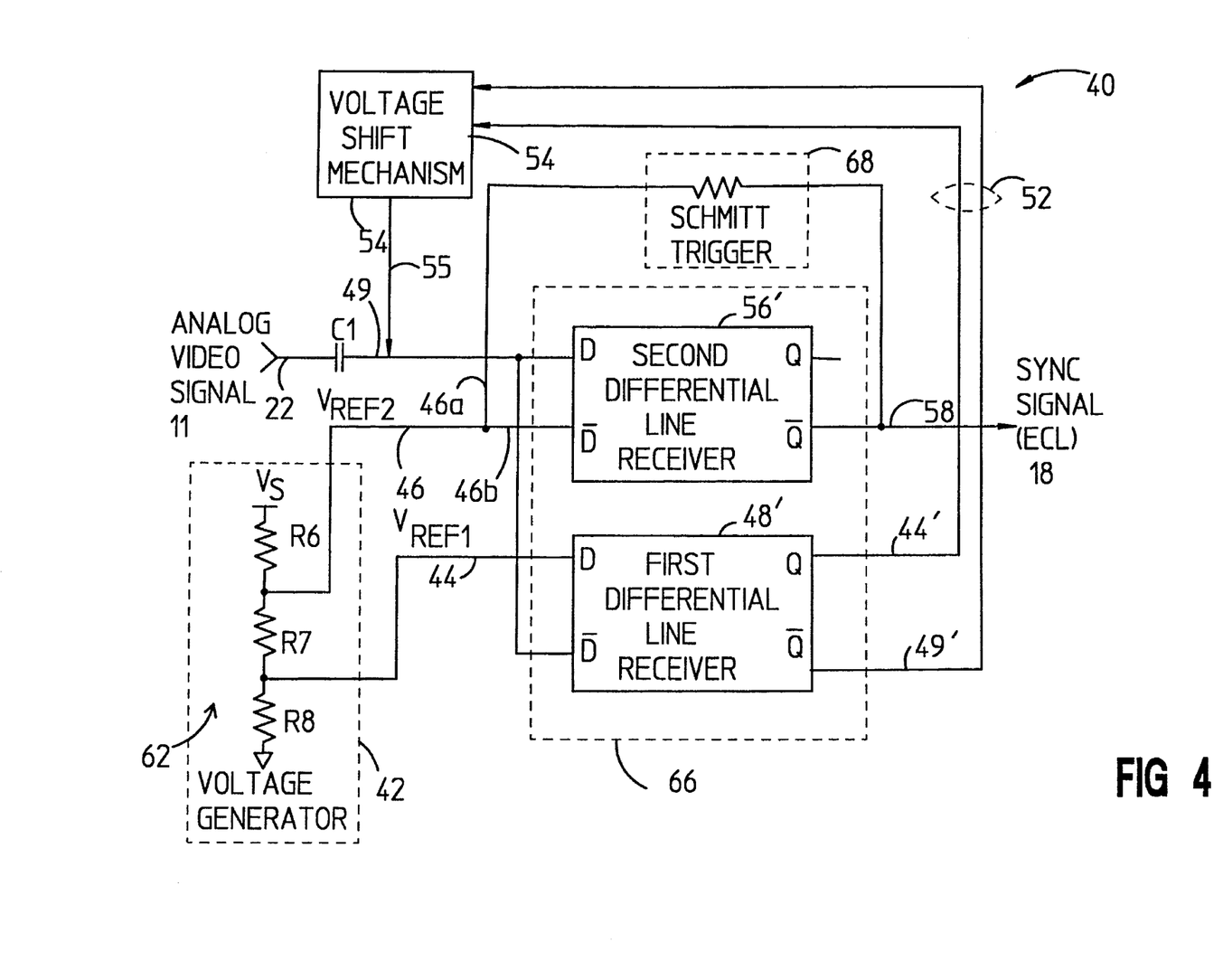
FIG. 4 is a schematic circuit diagram showing a specific implementation of the sync separation system of FIG. 3.

The first comparator 48 in combination with the voltage shift mechanism 54 ensures that the sync levels 16 (FIG. 1) within the analog video signal 11 are maintained at the first reference voltage $V_{REF1}$. Moreover, the second reference voltage $V_{REF2}$ is the threshold voltage which is used by the second comparator 56 in order to determine whether the analog video signal 11 is exhibiting a sync level 16. Preferably, the second reference voltage VREF2 is set at approximately half way between the blank level 14 and the sync level 16, as illustrated in FIG. 1. Moreover, as is apparent in FIG. 3, the voltages which control the first and second comparators 48, 56 as well as the voltage shift mechanism 54 are all derived from the same source, thereby resulting in a fully integrated feedback-controlled sync separation system A specific implementation of the sync separation 40 of FIG. 3 is illustrated in FIG. 4. Referring to FIG. 4, the voltage generator 42 of the sync separation system 40 has a voltage divider 62 for establishing the first and second references $V_{REF1}$, $V_{REF2}$. The sync separation system 40 is preferably implemented with conventional emitter coupled logic (ECL) electronic components and generates an ECL compatible logic signal on the output connection 58. The voltage divider 62 comprises resisters R6, R7, R8 connected in series between the supply voltage $V_S$ and ground (or common). The supply voltage $V_S$ is generally 12 volts in the preferred embodiment to permit use of ECL parts as described herein. The first reference voltage $V_{REF1}$ between resisters R7, R8 is preferably maintained at approximately 3.7 volts ($V_{BB}$ in ECL). In order to stablilize the first reference voltage $V_{REF1}$, a capacitor (not shown) may be placed in parallel with the resistor R8, connecting the connection 44 to ground. Moreover, the second reference voltage $V_{REF2}$ between the resisters R6, R7 is preferably maintained at approximately 100 millivolts (mV) above the first reference $V_{REF1}$, or at about 3.8 volts.

The second comparator 56 is preferably a fast differential line receiver. A suitable differential line receiver is an ECL differential line receiver provided by a model. MC10E416 integrated circuit (IC) 66, which is manufactured and made commercially available by the Motorola Corporation, U.S.A. Moreover, a logic high on connection 58 from the second differential line receiver 56' indicates a sync level 16 in the analog video signal 11, whereas a logic low indicates the absence of the sync level 16. It should be noted that the foregoing implementation of this IC is novel, in that the model MC10E416 IC is traditionally used for buffering ECL logic and not for receiving an analog video signal 11. Furthermore, it should be emphasized that other logic families could be employed to implement the second differential line receiver 56' with the functionality described herein. Finally, in the preferred embodiment, a $V_{BB}$ output (at about 3.7 volts; middle of ECL logic range) from the IC 66 is connected to $V_{REF1}$ on connection 44 so as to further stabilize $V_{REF1}$.

The data input terminal (D) and the inverse data input terminal (not D) of the second differential line receiver 56' are connected to the input connection 49 and the voltage generator output connection 46, respectively. The data output terminal (Q) of the second differential line receiver 56' is the output connection 58. Moreover, a Schmitt trigger mechanism 68 is connected between the output connection 58 and the voltage generator output connection 46 (second reference voltage $V_{REF2}$) for inhibiting adverse effects resulting from noise in the analog video signal 11, as will be further described hereinafter.

Another differential line receiver 48', called the first differential line receiver herein, is disposed for receiving both the analog video signal 11 and the first reference voltage $V_{REF1}$ on voltage generator output connection 44. The first differential line receiver 48' communicates the analog video signal 11 and the first voltage reference $V_{REF1}$ to the first comparator 48. The first differential line receiver 48' need not be as fast as the second differential line receiver 56', but is provided by the model MC10E416 IC 66, as shown in FIG. 4, in the preferred embodiment. The data input terminal (D) and the inverse data input terminal not D) of the first differential line receiver 48' are connected to the voltage generator output connection 44 and the input connection 49, respectively. The data output terminal (Q) and the inverse data output terminal (not Q) of the first differential line receiver 48' are connected to the inputs of a voltage shift mechanism 54, as is denoted by respective connections 44', 49'.

Figure 5:
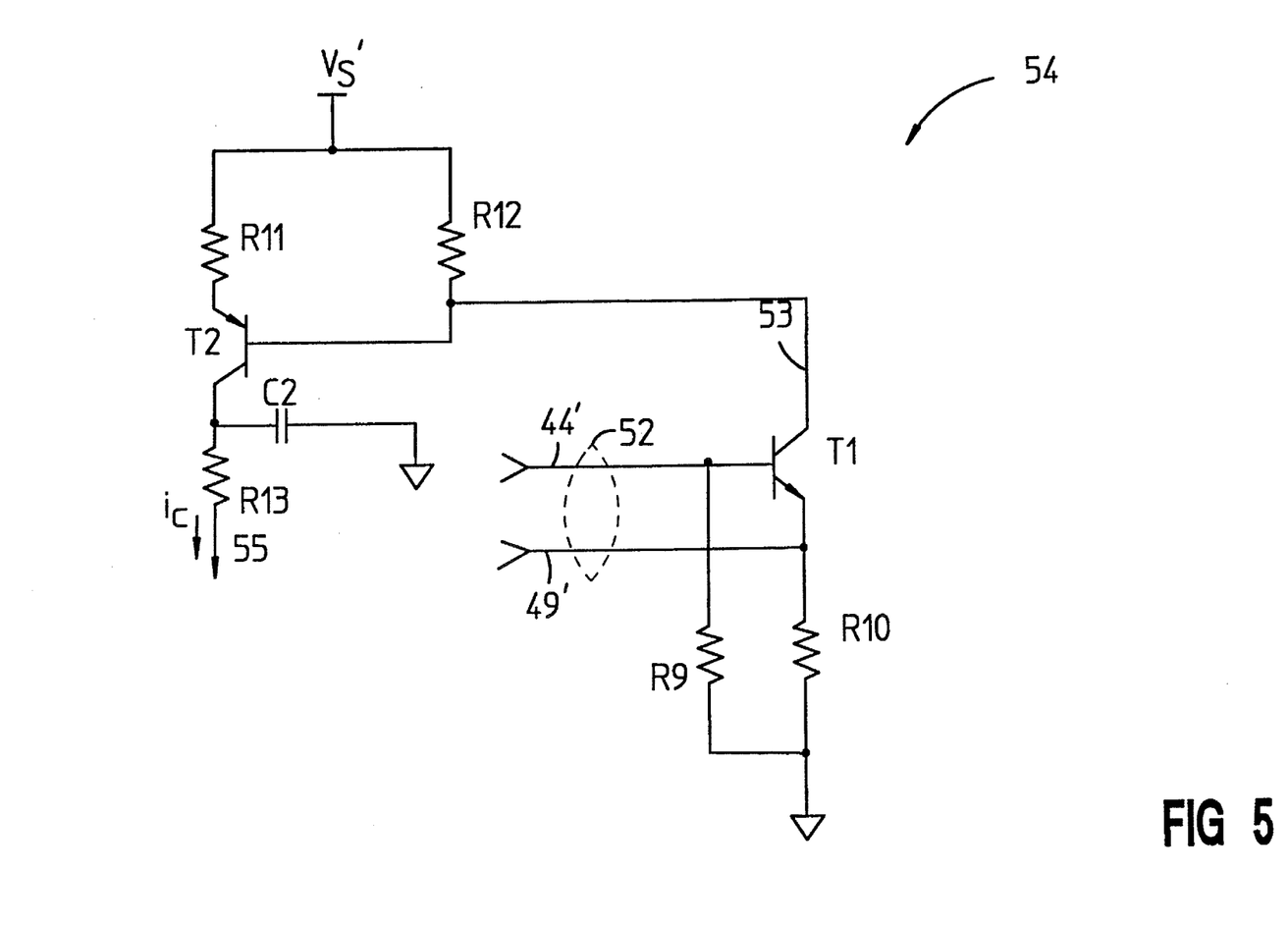
FIG. 5 is a schematic circuit diagram of a voltage shift mechanism of FIG. 4.

The voltage shift mechanism 54 is more specifically shown in FIG. 5. Referring to FIG. 5, the voltage shift mechanism 54 comprises a transistor T1 having a base connected to the connection 44' from the data output terminal (Q) of the first differential line receiver 48', a collector connected to connection 53, and an emitter connected to the connection 49' from the inverse data output terminal (not Q) on the first differential line receiver 48'. Moreover, ECL pull-down resistors R9, R10 are connected between the respective connections 44', 49' and ground. The foregoing configuration implements a comparison between the complimentary signals on respective connections 44', 49' for enhancing accuracy. If the signal on connection 44' is greater than the signal on connection 49', then the transistor T1 is switched on and current is sunk through the transistor T1, through the resistor R10, and to ground. Otherwise, when the signal on the connection 49' is greater than the signal on the connection 44', then the transistor T1 is turned off, thereby isolating the connection 52. When the connection 52 is isolated, this permits the voltage shift mechanism 54 to increase the voltage offset of the analog video signal 11.

A transistor T2 with biasing resistors R11, R12 is also disposed within the voltage shift mechanism 54. The resistor R11 is connected between the emitter of the transistor T2 and the supply voltage $V'_S$ (preferably 12 volts). The resistor R12 is connected between the supply voltage $V_S$ and the base of the transistor T2. The collector of the transistor T2 is connected to the input connection 49 through a resistor R13. A capacitor C2 is also disposed between the collector of the transistor T2 and ground in order to help in maintaining gradual voltage change across the resistor R13 and within the analog video signal 11.

The voltage shift mechanism 54 of FIG. 5 is essentially a variable current mechanism which provides a continuous current $i_c$ to the analog video signal 11 on connection 49. The resistor R13 and the capacitor C2 are such that the voltage across the resistor R13 is typically greater than 1 volt and such that the voltage across the capacitor C2 exhibits minimal change during a scan line of the analog video signal 11 (FIG. 1). Generally, the continuous current $i_c$ varies approximately between 150 and 300 microamperes (μA) in the preferred embodiment. Fluctuation of the continuous current $i_c$ is controlled as follows.

When the sync level 16 (FIG. 1) is less than the first reference voltage $V_{REF1}$, as determined by the first differential line receiver 48', then the connection 53 carries current away from the supply voltage $V'_S$. This is accomplished by permitting current to be sunk through the transistor T1 and resistor R10 to ground. Transistor T1 is turned on by driving connection 49' to a logic high, while maintaining connection 44' at a logic low. This predicament causes current to flow from the supply voltage $V_S$ through the transistor T2, resistor R11, and into capacitor C2. During a scan line, current flows from the capacitor C2 through resistor R13 and into the analog video signal 11 via connection 55. This causes the continuous current $i_c$ to increase to thereby raise the sync level 16 towards the first reference voltage $V_{REF1}$.

In the alternative, when the sync level 16 (FIG. 1) is greater than the first reference voltage $V_{REF1}$, as determined by the first differential line receiver 48', then the connection 53 is isolated by turning off the transistor T1 via driving connection 49' to a logic low, while driving connection 44' to a logic high. Accordingly, the continuous current $i_c$ is slightly reduced as no current is provided to the capacitor C2 by the transistor T2. This predicament causes the sync level 16 to converge toward the first reference voltage $V_{REF1}$. It should be noted that, even though the current $i_c$ is reduced, it still remains continuous and provides input leakage current to the first and second differential line receivers 48', 56' on connection 55.

OPERATION

The overall operation of the sync separation system 40 is as follows, with reference to FIGS. 4 and 6. The analog video signal 11 is received by the input connection 49 of the novel sync separation system 40. The first and second reference voltages $V_{REF1}$, $V_{REF2}$ are generated by the voltage divider 62 and are input to the first and second differential line receivers 48', 56', respectively. The analog video signal 11 and the first reference voltage $V_{REF1}$ pass through the first differential line receiver 48' and are compared together by the first comparator 48. When the sync level 16 of the analog video signal 11 is lower than the first reference voltage $V_{REF1}$, then the first differential line receiver 48' forces the voltage shift mechanism 54 to increase the continuous current $i_c$ so that the sync level 16 converges towards the first voltage reference $V_{REF1}$. When the sync level 16 is greater than the first reference voltage $V_{REF1}$, then the first differential line receiver 48' causes the voltage shift mechanism 54 via connections 44', 49' to decrease the continuous current $i_c$ so that the sync level 16 of the analog video signal 11 decreases and converges toward the first reference voltage $V_{REF1}$.

After the analog video signal 11 has been shifted by the voltage shift mechanism 54, it is compared to the second reference voltage $V_{REF2}$ within the second differential line receiver 56'. The Schmidt trigger mechanism 68 causes a slight variation in the comparison voltage, or the second reference voltage $V_{REF2}$, which is utilized by the second differential line receiver 56'. Specifically, when the analog video signal 11 is not exhibiting a sync level 16, then the analog video signal 11 is compared to the second reference voltage $V_{REF2}$ at about 100 millivolts (mV) above the sync level 16, or compared to about 3.8 volts. However, when the analog video signal 11 exhibits the sync level 16, then the analog video signal 11 and, particularly the sync level 16, is compared to about 150 millivolts (mV) above the sync level 16, or compared to about 3.85 volts.

Figure 6A:
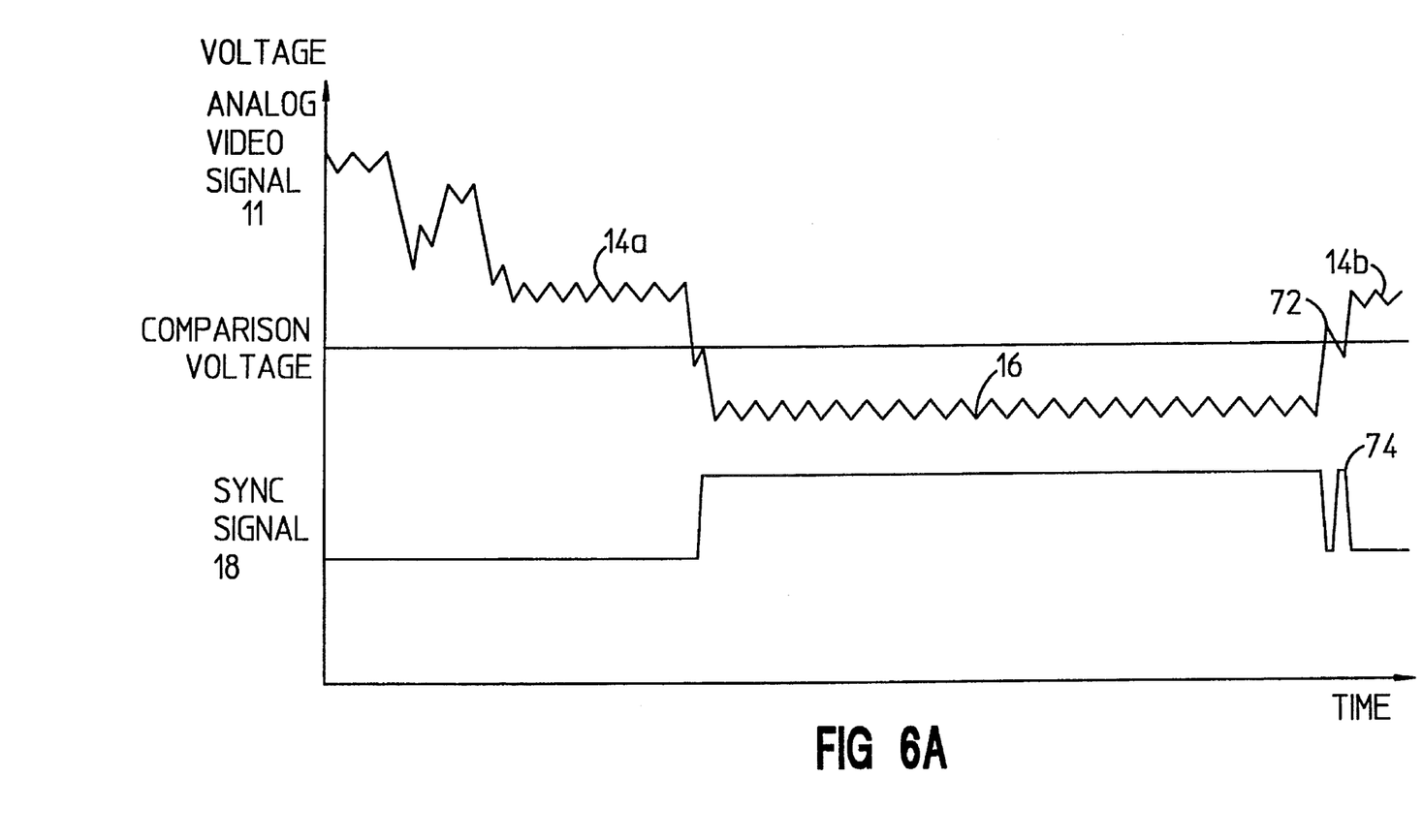
FIG. 6A is a graph illustrating response of a second differential line receiver of FIG. 4 without implementation of a Schmitt trigger mechanism.
Figure 6B:
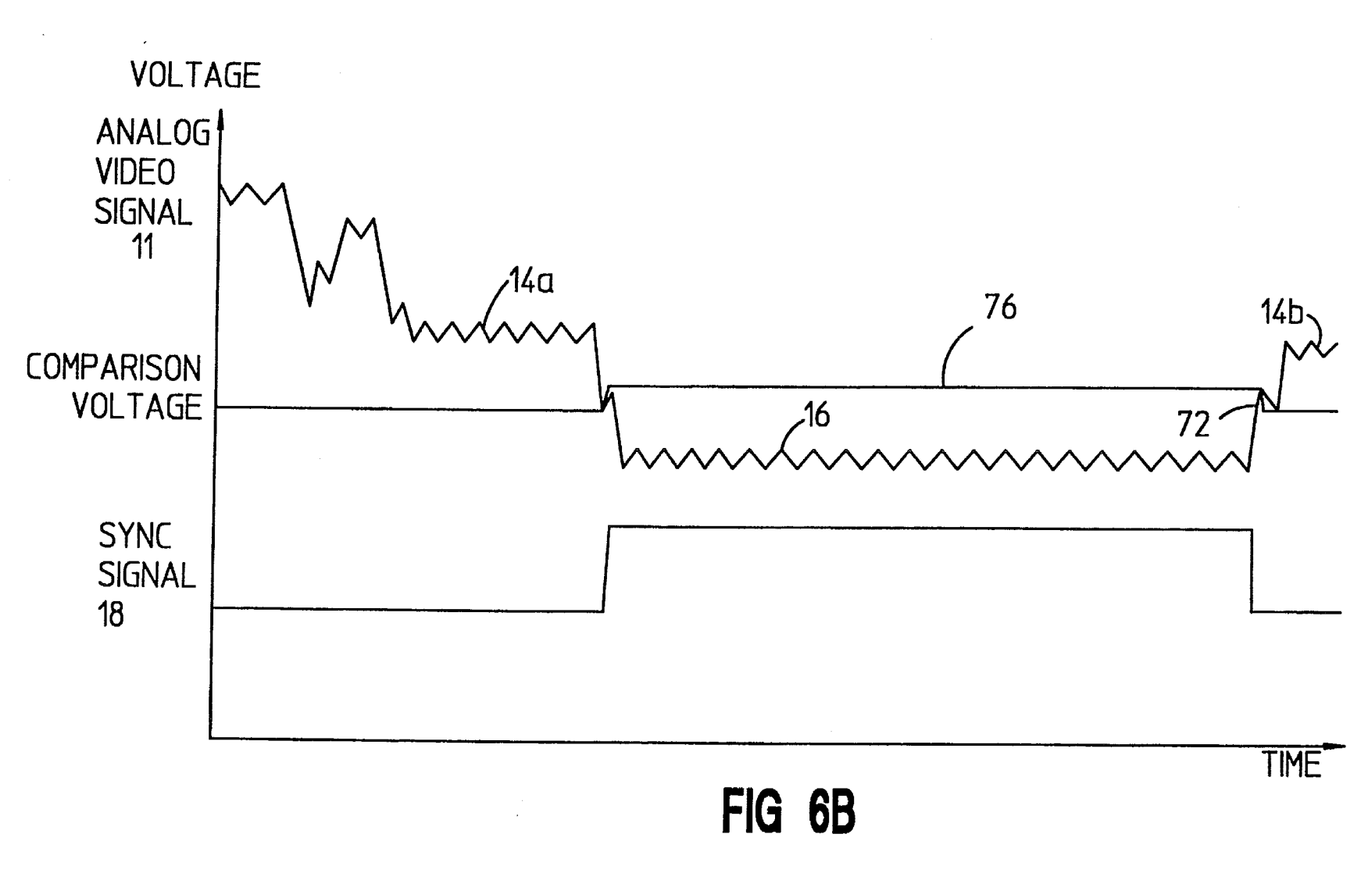
FIG. 6B is a graph illustrating response of the second differential line receiver of FIG. 4 with implementation of a Schmidt trigger mechanism.

This behavior is illustrated in FIGS. 6A and 6B. As shown in FIG. 6A, without the Schmidt trigger mechanism 68, the sync signal 18 may be undesirably triggered by noise 72 within the analog video signal 11, as is indicated at reference numeral 74. With the implementation of the Schmidt trigger mechanism 68, as shown in FIG. 6B, the comparison voltage of the second differential line receiver 56' is slightly raised during the sync level 16, as indicated at reference numeral 76, so that the noise 72 does not undesirably trigger the second differential line receiver 56' and distort the sync signal 18.

In addition to providing noise immunity, the Schmitt trigger mechanism 68 further aids in ECL edge generation. Because the analog video signal 11 takes approximately three nanoseconds ($10^{-9}$ seconds) to transition from the 286 millivolt (mV) between the blank level 14 and the sync level 16, an ECL receiver (not shown) for receiving the sync signal 18 does not pick up noise (as small as about 10 to 20 millivolts), which would normally result from frequencies about between 400 and 5000 megahertz (MHz) without the Schmitt trigger mechanism 68. Accordingly, the second differential line receiver 56' produces the sync signal 18 with minimal skew with respect to the incoming analog video signal 11 and at the correct voltage level for use with other ECL components, such as an ECL phase detector or some other suitable circuitry.

It will be obvious to those skilled in the art that many variations and modifications may be made to the embodiments described hereinbefore without substantially departing from the spirit and scope of the present invention. It is intended that all such variations and modifications be included herein within the scope of the present invention, as is set forth in the following claims.

Now, therefore, the following is claimed:

1. A synchronization separation system for accurately generating a synchronization signal from an analog video signal by using feedback, the synchronization signal indicative of when the analog video signal exhibits a synchronization level, comprising:

a voltage generator configured to generate first and second reference voltages, the voltage generator having a first output;

a first comparator configured to compare said analog video signal to said first reference voltage, said first comparator for generating a shift control signal;

a voltage shift mechanism configured to receive said shift control signal and to adjust said analog video signal so that said synchronization level of said analog video signal converges toward said first reference voltage;

a second comparator configured to compare said analog video signal to said second reference voltage, said second comparator having an output, said second comparator for generating said synchronization signal indicative of when said analog video signal exhibits said synchronization level; and a schmitt trigger disposed between said first output of said voltage generator and said output of said second comparator.

2. The system of claim 1, wherein said voltage generator comprises a resistor network serving as a voltage divider.

3. The system of claim 1, wherein said voltage shift mechanism comprises a variable current mechanism for driving a current into said analog video signal.

4. The system of claim 1, wherein said first and second comparators are differential line receivers.

5. The system of claim 3, wherein said variable current mechanism drives said current continuously into said analog video signal.

6. The system of claim 4, wherein said differential line receivers comprise ECL logic.

7. A method for accurately generating a synchronization signal from an analog video signal by using feedback, the synchronization signal indicative of when the analog video signal exhibits a synchronization level, comprising the steps of:

generating first and second reference voltages;

performing a first comparison between said analog video signal and said first reference voltage, said first comparison performed by a first differential line receiver;

adjusting said analog video signal based upon said first comparison so that said synchronization level of said analog video signal converges toward said first reference voltage;

performing a second comparison between said analog video signal and said second reference voltage, said second comparison performed by a second differential line receiver; and generating said synchronization signal indicative of when said analog video signal exhibits said synchronization level based upon said second comparison.

8. The method of claim 7, further comprising the step of driving a current into said analog video signal in order to adjust said analog video signal.

9. The method of claim 7, further comprising the step of driving said synchronization signal to an ECL logic gate.

10. The method of claim 8, further comprising the step of driving said current continuously into said analog video signal.

* * * * *